United States Patent [19]

Sakamoto

[11] 3,750,186
[45] July 31, 1973

[54] METHOD AND APPARATUS FOR MAKING A RECORD CARRIER FOR AUTOMATIC EMBROIDERY SEWING MACHINE

[75] Inventor: Isamu Sakamoto, Nishinomiya, Japan

[73] Assignee: Konan Camera Laboratory Company Limited, Kobe City, Japan

[22] Filed: May 11, 1970

[21] Appl. No.: 36,111

[52] U.S. Cl.............. 346/1, 112/102, 112/121.12, 318/568, 346/33 MC
[51] Int. Cl............................... G01d , D05b 21/00
[58] Field of Search..................... 346/33 MC, 1; 112/121.11, 121.12, 102, 103; 318/568, 576, 577, 578; 340/347 P; 235/151.11; 340/174.1 K; 33/1 C, 1 M, 1 N

[56] References Cited
UNITED STATES PATENTS

| | | | |
|---|---|---|---|
| 2,916,342 | 12/1959 | Neergaard | 346/33 MC X |
| 2,996,348 | 8/1961 | Rosenberg | 346/33 MC |
| 3,072,833 | 1/1963 | Kerr et al. | 346/33 MC X |
| 3,251,039 | 5/1966 | Dupy et al. | 346/33 MC X |
| 3,459,145 | 8/1969 | Ramsey et al. | 112/121.11 |

*Primary Examiner*—Joseph W. Hartary
*Attorney*—Otto John Munz

[57] ABSTRACT

Method and apparatus for making a record carrier for an automatic embroidery sewing machine to detect amounts of longitudinal, lateral and angular movements of a cloth frame moving device, amplitude detection of the machine needle and start-stop instructions for the machine, with rotary pulse generators that generate pulses for the various movements. A magnetic record carrier records the pulse trains taken as outputs of the pulse generators.

2 Claims, 10 Drawing Figures

PATENTED JUL 31 1973 3,750,186

INVENTOR
ISAMU SAKAMOTO

BY *[signature]*

ATTORNEY

PATENTED JUL 31 1973 3,750,186

INVENTOR
ISAMU SAKAMOTO

BY *Otto John Munz*

ATTORNEY

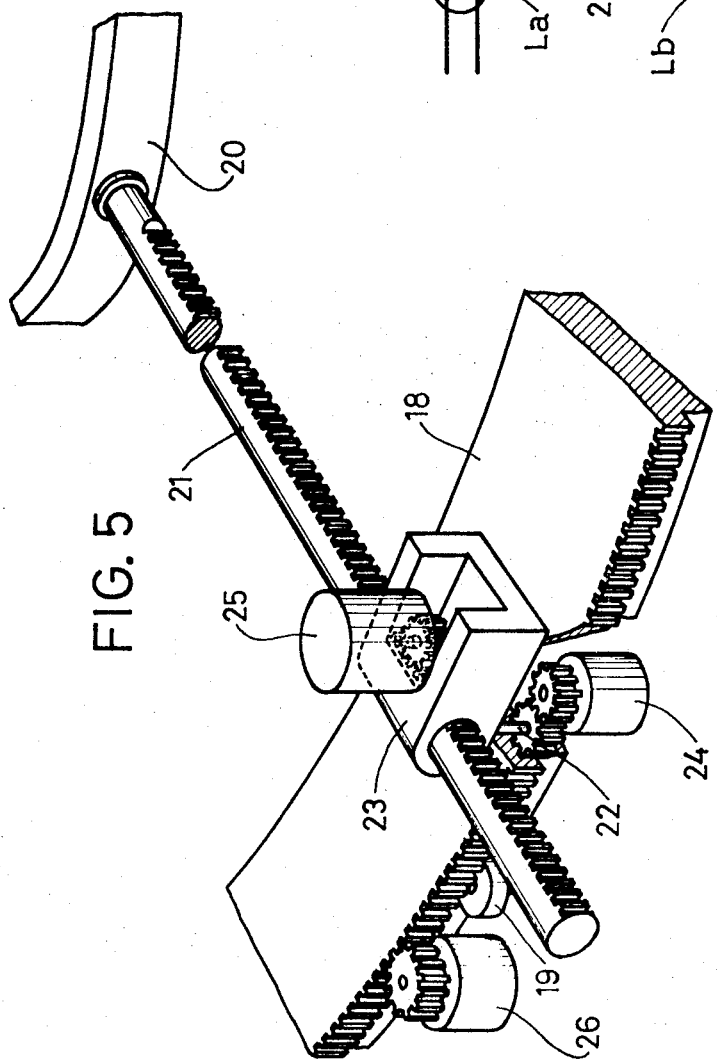
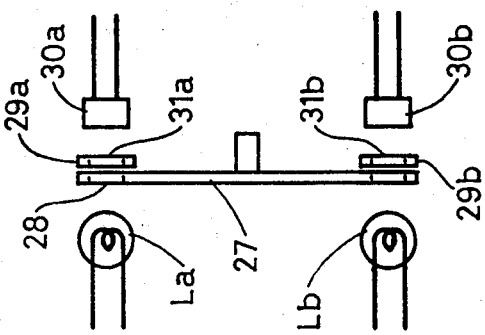

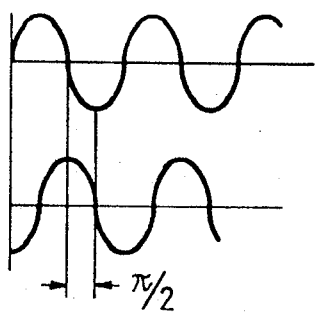
FIG. 7
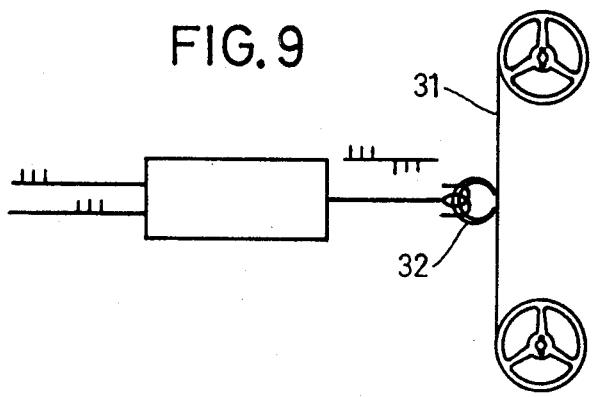
FIG. 9
FIG. 8
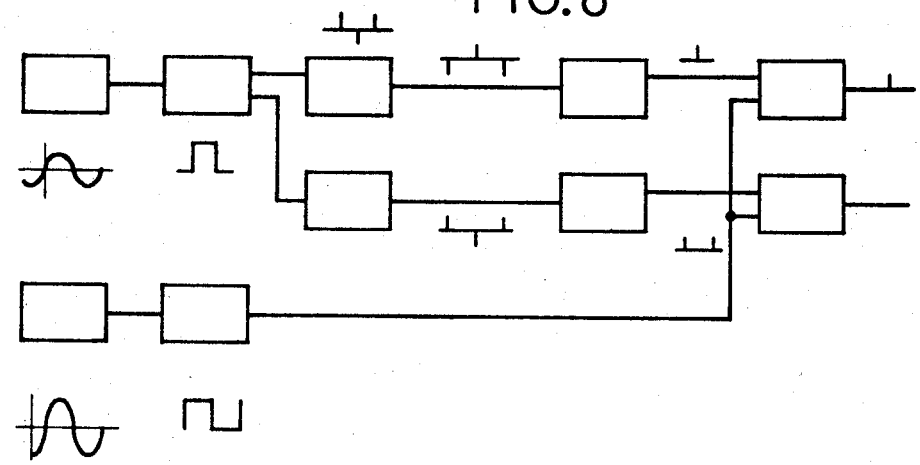
FIG. 10
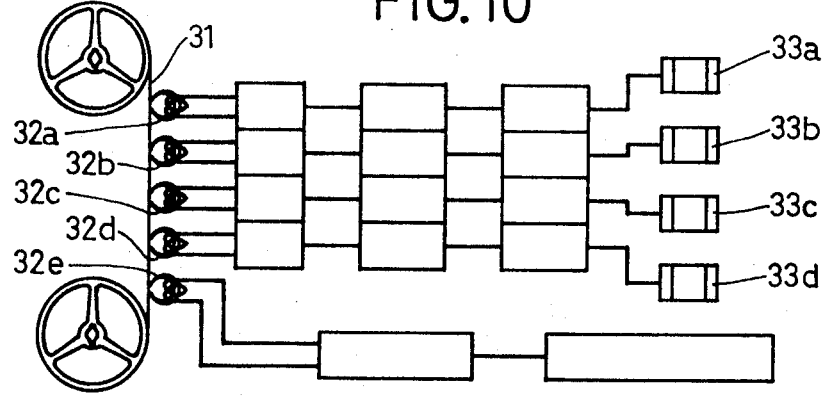
INVENTOR
ISAMU SAKAMOTO

METHOD AND APPARATUS FOR MAKING A RECORD CARRIER FOR AUTOMATIC EMBROIDERY SEWING MACHINE

This invention relates to a method of making a record carrier for an automatic embroidering sewing machine and a apparatus including cloth frame moving device for an automatic embroidering sewing machine.

An object of the present invention is to provide a method of easily recording the program the longitudinal and lateral movements and rotation of a cloth frame and the lateral amplitude of a machine needle within a short period of time for use in an embroidering sewing machine.

Another object of the present invention is to provide an automatic embroidery sewing machine wherein a magnetic tape in which the movement records are made is fed to a reproducing machine for reproducing the records whereby exactly the same embroidery design as the original embroidery design is reproduced.

A further object of the present invention is to provide a cloth frame moving device in which the amounts of longitudinal, lateral rotational movements and the lateral amplitude of the needle are made with pulse motors.

In the accompanying drawings:

FIG. 5 is a magnified an enlarged perspective view of a particular part of the device of FIG. 4 ;

FIG. 6 is a side view showing an example of a rotary pulse generator;

FIG. 7 is a graph diagram showing an output curve of a rotary pulse generator;

FIG. 8 is a block diagram showing the process of the wave form treatment shown in FIG. 7;

FIG. 9 is a diagrammatic representation of showing an embodiment of a a recording device; and FIG. 10 is a diagrammatic representation of an embodiment of a reproducing device.

The present invention provides an automatic embroidering sewing machine in which a record carrier such as a punched tape, a magnetic sheet or tape on which records are made is held so that embroidering may be automatically accomplished. The record carrier is made by the hereinbelow described method.

Figure 1:
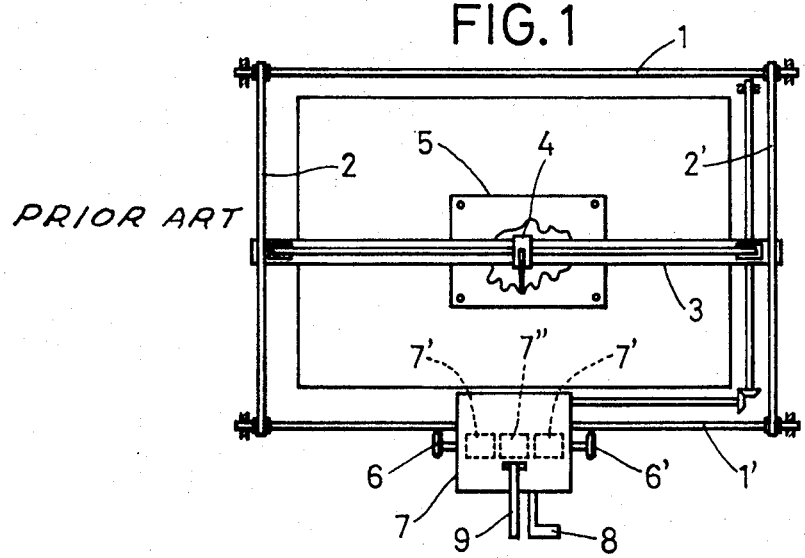
FIG. 1 is a plan view schematically showing a conventional device in accordance with the prior art.

As shown in FIG. 1, a prior art device comprises: two shafts 1 and 1' that are parallel to each other are position a proper distance from each other; belts 2 and 2' are hung on the respective ends of the shafts; and a tracer 4 supported on a guide bar 3 is mounted between said belts 2 and 2'. When two handles 6 and 6' are separately operated, the tracer 4 traces a figure or design that is described on a pattern 5 and the movements of pointer of the tracer are determined being divided into X and Y components.

At the same time, computing mechanisms 7' in a record making device 7 that are connected with the handles 6 and 6' compute the X and Y components.

Then, if a pedal 8 is operated to a stopping position of the tracer 4, a recording mechanism 7'' records the above mentioned computed result in the record carrier 9. The respective points traced by the tracer are the points at which the needle of the sewing machine falls when they are reproduced. The tracer 4 makes point movements with the handles 6 and 6'. Therefore, even if, for example, a figure of a leaf design is recorded and reproduced as in A in FIG. 2, the design will only be an outline of the same.

Figure 2:
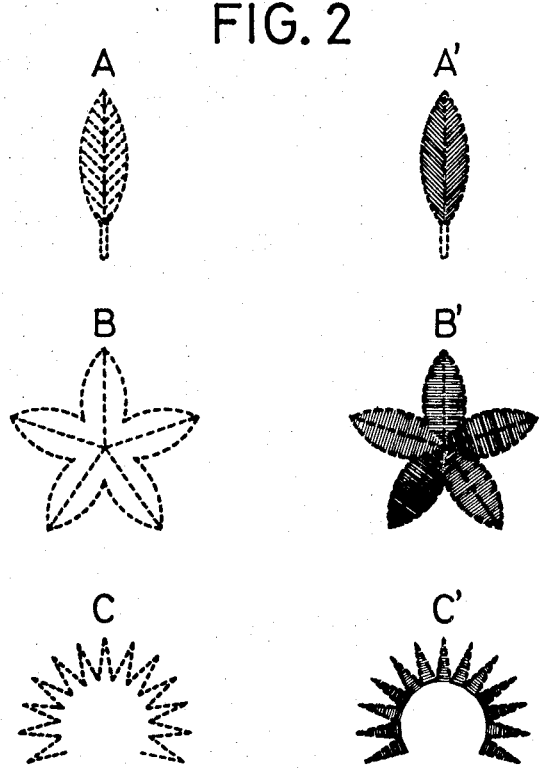
FIG. 2 is a view showing various embroidered designs.

There is considerable time and labor required to make an embroidery in which the space between the veins is filled as in A' in FIG. 2. This filling provides a three-dimensional effect a swelling appearance and thus, a pleasing vision effect results. Further, it is to be noted that the moving device that includes the shafts 1 and 1', belt 2 and 2' and the freely moving tracer on guide bar 3, cannot be rotated in itself. In order to trace a flower design and radial design as shown in B and C, respectively, in FIG. 2. much skill and time a technician familiar with the art required. It is only with considerable difficult that the inside spaces are filled as in B' and C' in FIG. 2.

The present invention relates to a method of making a record carrier and to apparatus a cloth frame moving device. The invention is characterized by, in the making of a record carrier if the initial sheet is made by the same operation as that of the ordinary embroidering operation. That is, the ordinary operation peformed by a skilled operator having a high technical skill of a zig-zag embroidering sewing machine that is provided with a cloth frame moving device which can not only move but also rotate the X and Y components, and produce the program of the X and Y components and rotation of the cloth frame, the lateral amplitude of the needle and the starting and stopping of the sewing machine. The various movements can easily be recorded within a short time frame by the use of rotary pulse generators. In producing embroidery designs, if the above mentioned record carrier is fed to a reproducing sewing machine, even an operator having little or no knowledge and technique of embroidering can reproduce the embroidery design perfectly. Thus, an improved efficiency and a higher production will result.

Broadly, in accordance with the present invention, the method relates to rapidly making a record carrier wherein an operator sews a selected embroidery design with an automatic embroidering sewing machine having a sewing needle and comprises the steps as follows:

moving a cloth frame assembly having a stretched object or workpiece supported on the assembly and moving short distances in X-axis and Y-axis directions and in an angular rotary direction to an operative position;

moving the needle in a Y-axis direction to an operative position;

detecting the distance amounts of the various movements of the respective cloth frame assembly and needle by the use of individual rotary pulse generators;

the pulse generators generating output pulses representing the distance amounts in response to the operative position of the workpiece relative to the operative position of the needle;

recording the output pulses as master record trains in a magnetic record carrier; and playing back the recorded record carrier into said cloth frame assembly to automatically reproduce the selected embroidery design, whereby thereafter an unskilled operator may monitor the operation of the automatic embroidery sewing machine to produce the selected embroidery design.

Figure 3:
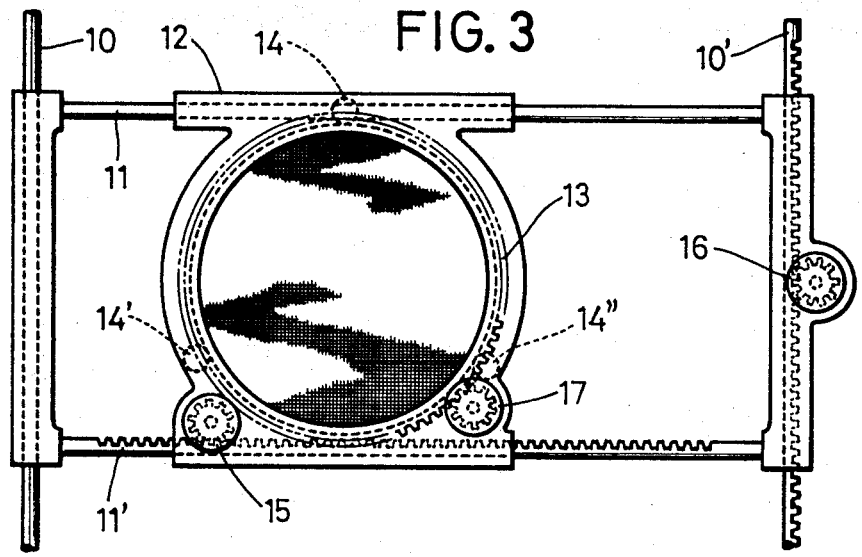
FIG. 3 is a plan view showing a cloth frame moving device for an embroidering sewing machine according to the present invention.

More specifically, the cloth frame moving device to be fitted in the recording embroidering sewing machine in working the method of the present invention is explained with reference to FIG. 3. There is illustrated a moving device in which two rails 11 and 11' are mounted on two rails 10 and 10' to form a rectangular structure. The rails 10, 10' are separated from each other by a predetermined distance to each other. A carriage 12 is slidably mounted to ride on the two rails 11 and 11'. Thus, the rails 11, 11' and 10, 10' form rectangular coordinates form rectangular coordinates for the X and Y components respectively.

A cloth frame 13 in the form of a ring or a circular member is operatively supported by a gear arrangement in said carriage 12 and is rotatable with mounted on supporting wheels 14, 14' and 14'' that are provided in three positions that equally divide the outer periphery of said frame. Therefore, in making an embroidery design, the cloth frame can not only rotate but also freely move reciprocate within the rectangular structure by virtue of the gear arrangement through the rails ten and 10' and rails 11 and 11'. Thus, all of three kinds of movements are recorded in the record carrier. The movement of the X component is detected by a rotary pulse generator 15. That of the Y component is detected by a rotary pulse generator 16. The movement for the rotation of the rotary cloth frame is detected by a rotary pulse generator 17.

Figure 4:
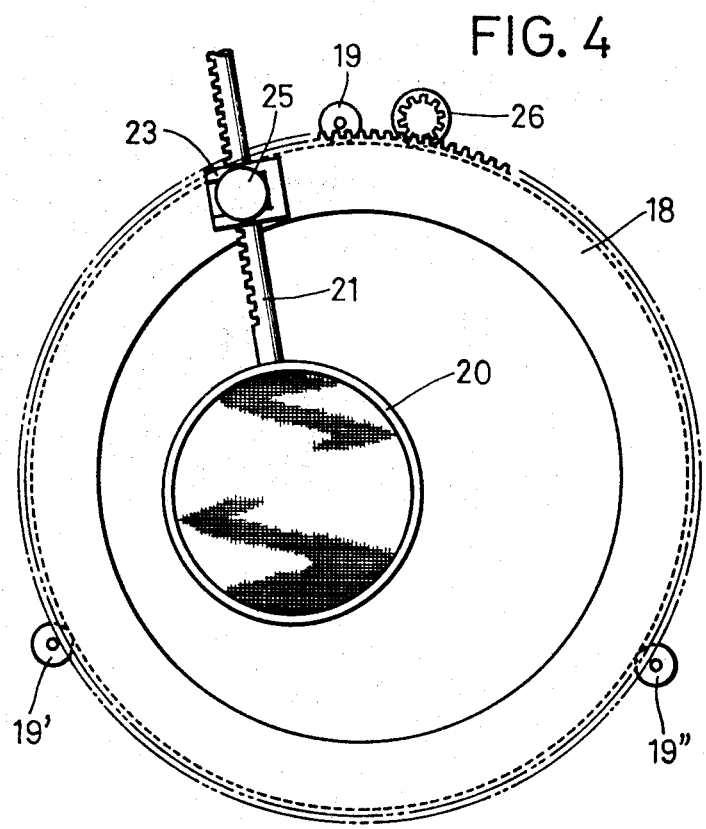
FIG. 4 is a plan view of another embodiment of the device shown in FIG. 3.

FIGS. 4 and 5 show another embodiment of the present invention wherein a similar cloth frame moving device has an annular frame 18 in the form of a large ring that is supported so as to be easily rotatable by hand by means of supporting wheels 19, 19' and 19'' that are provided in three positions equally dividing the outer periphery of said frame. A small ring-shaped frame located within this annular frame 18 is a cloth frame 20 in which embroidering is to be made. An arm rod 21 fixed to the outer periphery of the cloth frame 20 is slidably inserted in a blockshaped supporter 23 made rotatable by a supporting shaft 22 (FIG. 5) that is erected in a part of the annular frame 18. Therefore, the cloth frame 20 can be moved and rotated by the supporter 23 and at the same time the annular frame 18 itself rotates to form polar co-ordinates. Consequently, the cloth frame can freely move and rotate in any direction within the range of the annular frame. The pulse generator for detecting the above mentioned three types of movements are unit 24 that is operatively connected with the rotation of the supporting shaft 22, the unit 25 for the movement of the arm rod 21 and the unit 26 that is operatively connected with the rotation of the annular frame 18.

An example of the rotary pulse generator that can be used in the above mentioned two embodiments shall be explained. A pulse generator should be of the type that can generate a number of pulses that are proportional to the variation of the rotational angle caused the rotation, that is to say, one that can convert the distance to a pulse number and generate pulses of signs respectively different depending on the direction of the rotation. With reference to FIG. 6, a rotary slit plate 27 that is fitted in the pulse generator has slits 28 in the outer peripheral part and rotates while keeping a slight clearance between it and each of fixed slit plates 29a and 29b that have respectively slits 31a and 31b. On one side of said rotary slit plate 27 are provided lamps La and Lb that are opposite to one another and on which are arranged respectively photoelectric elements 30a and 30b. When the slits 28 of the rotary slit plate 27 coincide with the respective slits 31a and 31b of the fixed slit plates 29a and 29b, the lights from the lamps La and Lb that fall upon the photoelectric elements 30a and 30b respectively generate electric powers. The slit plates 29a and 29b are fixed so as to have a phase difference of 90° from each other.

When the rotary slit plate 27 rotates, the output curve that is shown in FIG. 7 is produced. The rotating directions of both outputs of this phase difference of ½ $\pi$ are judged or sensed with a known normal and reverse rotation judging or sensing circuit (FIG. 8). An output pulse is produced at the output terminal on the upper side by normal rotation and at the output terminal on the lower side by reverse rotation. Both of these outputs are made pulses respectively in the positive and negative directions by virtue of a composite circuit as shown on FIG. 9 and are recorded in a magnetic tape 31 through a magnetic head 32. Therefore, in case the three pulse generators used in the above mentioned two cloth frame moving devices generate positive or negative pulses that are proportional respectively to the two movements and rotation, such pulses are recorded on turn in the magnetic tape.

The adjustment of the lateral amplitude of the lateral swing of the needle of the zigzag embroidering sewing machine that is used in the present invention is made by the pushing of a lever with a knee. Therefore, a pulse generator to detect the amount of the movement of the lever is required. Thus four pulse generators including the three pulse generators of the cloth frame moving device are used. Therefore, there are a total of four sets of the device shown in FIG. 9. Further, as five tracks are provided on the magnetic tape 31, records can be properly made on the tape.

Signals relating to the stopping and starting of the sewing machine are recorded on another track. The instruction for automatically stopping the running of the tape when it is necessary to exchange the thread during the operation thereof or when the operation is ended, is also recorded on this track. Signals such as three kinds of audio frequencies, for example, 200, 1,000 and 7,000 Hz can be recorded on this track. By the combination of these kinds, various required can be accomplished. These three kinds (represented by A, B and C) of signals that are recorded on one track are separated by a filter circuit. A table of such combinations is shown in the following wherein "1" shows that the signal is recorded there.

|   | A | B | C |   |
|---|---|---|---|---|
| 1 | 0 | 0 | 0 | The sewing machine stops. |
| 2 | 1 | 0 | 0 | The machine rotates at a slow rate. |
| 3 | 1 | 1 | 0 | The machine rotates at a fast rate. |
| 4 | 1 | 0 | 1 | The tape stops as the tape thread breaks. |
| 5 | 0 | 1 | 1 | The tape stops to change the tape thread. |

That is to say, when the sewing machine is rotating at a slow rate, only the signal A is recorded and, when it is rotating at a fast rate, both signals A and B are recorded.

The record carrier of the present invention is made as described above. The records are reproduced as follows. Exactly the same structural arrangement for cloth frame moving devices of the embodiments shown either in FIGS. 3 or 4 and 5 is made on a supporting table for a reproducing sewing machine. Further, the respective rotary pulse generators of said embodiments are replaced with pulse motors to drive the cloth frame moving device of the reproducing machine. When the magnetic tape 31 in which records have been made is fitted positioned in to the tape driving device of the reproducing sewing machine, five magnetic heads 32a to 32e come into contact with the tape as illustrated in FIG. 10. Among them, the magnetic heads 32a, 32b and 32c pick up the instructions magnetized by the three pulse generators of the recording sewing machine and the magnetic head 32d picks up the lateral amplitude of the needle. Further, the magnetic head 32e receives the starting and stopping instructions for the sewing machine. Therefore, the above mentioned magnetic heads 32a to 32d drive the respective pulse motors 33a to 33d through an amplified pulse motor driving circuit. The magnetic head 32e starts and stops the reproducing sewing machine through an amplified starting and stopping control circuit. When the records in this magnetic tape 31 are to be reproduced, the cloth frame moving device is set in the same position as in the case of making the recorded tape of the recording sewing machine and the machine is started, an embroidered design similar to the original figure can be reproduced. Thus, even an operator having little or no knowledge embroidering experience can perform the operation relatively easy.

Thus, in the conventional record carrier making method, the point-movement of the tracer has been performed manually. On the other hand, according to the present invention, the cloth frame moving device provides that the cloth frame is rotated in the X and Y axis directions and the respective movements are detected by the rotary pulse generators for use in a recording sewing machine The present invention, further provides that the initial sheet be made by the same operation as that of the an ordinary embroidering operation and with this type of sewing machine an operator having a high degree of skill in the field may record, the program of of the X and Y axis directions and rotating direction of the cloth frame, the lateral amplitude of the needle and the starting and stopping of the sewing machine as an original record carrier very easily within a short period of time by the utilization of the pulse generators. Therefore, not only such designs as in A', B' and C' in FIG. 2 can be recorded but also any complicated figures can be very quickly recorded. In producing the embroidery design, if the above mentioned record carrier is fed to a reproducing sewing machine, the original embroidery design can be reproduced perfectly Thus, an improved efficiency and a higher production will result.

Further, it is to be understood that the present invention can be applied to the automation of not only embroidering but also to other sewing operations as well.

What is claimed is:

1. A method of making a record carrier for controlling an automatic embroidering sewing machine wherein an operator sews a selected embroidery design with an automatic sewing machine having a sewing needle comprising the steps of:
   providing a cloth frame assembly having a stretched workpiece supported thereon;
   moving said cloth frame distance amounts in X-axis and Y-axis directions and in an angular rotary direction during the sewing of said design;
   moving said needle by a distance amount in an X-axis direction during the sewing of said design;
   detecting the distance amounts of the various movements of the respective cloth frame assembly and needle by the use of individual rotary pulse generators;
   generating output pulses from said pulse generators, which pulses represent said distance amounts;
   recording said output pulses as master record trains in a magnetic record carrier;
   whereby said recorded record carrier may be played back to control an automatic embroidering sewing machine to reproduce said design.

2. Apparatus for making a record carrier for controlling an automatic embroidering sewing machine wherein an operator sews a selected embroidery design with an automatic embroidery sewing machine having a sewing needle comprising in combination;
   a first pair of rail members positioned parallel to each other and spaced from one another in the Y-axis plane;
   a second pair of rail members positioned parallel to each other and spaced from one another in the X-axis plane;
   individual rotary pulse generators connected with said first rail member pair, said second rail member pair, and said cloth frame assembly, respectively;
   each said pulse generators having a means to detect the amounts of movements on the respective X-axis and Y-axis planes and the amount of the variation of the rotation of said cloth frame assembly and a means to generate output pulses which represent said amounts;
   means connected to said pulse generators to record said output pulses on a magnetic record carrier,
   whereby said recorded record carrier may be played back to control an automatic embroidering sewing machine to reproduce said design.

* * * * *